United States Patent Office 3,123,619
Patented Mar. 3, 1964

3,123,619
PROCESS FOR PREPARING HEMIKETALS
John J. Vill, Wheaton, Md., assignor to W. R. Grace
& Co., a corporation of Connecticut
No Drawing. Filed Feb. 25, 1963, Ser. No. 260,834
7 Claims. (Cl. 260—333)

The present invention relates to the preparation of hemiketals, and more specifically to an improved method by which hemiketals may be prepared from relatively inexpensive starting materials.

It is known that hemiketals possessing cyclic substituents are valuable intermediates for the preparation of dibasic acids. For example, cyclodecan-1-one may be converted by straightforward chemical methods into sebacic acid. A typical route one would follow in such a preparation is outlined in the following equations:

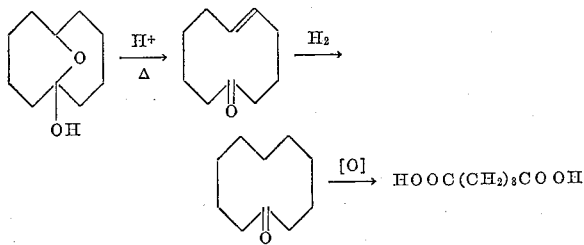

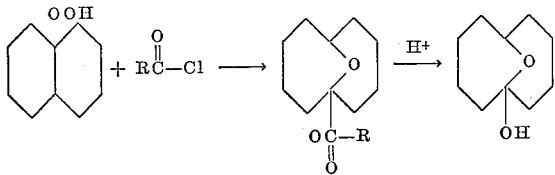

In the above synthesis the most difficult step involves obtaining the initial hemiketal by way of an economical process. To date the only practical way for obtaining a hemiketal such as cyclodecan-1-ol-6-one involves the formation of hydroperoxide of decalin, and subsequent reaction of the hydroperoxide with an acid chloride followed by heating and hydrolysis. Such a procedure may be outlined as follows:

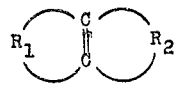

Combination of the above equations would represent an attractive method for obtaining valuable dibasic acids from cyclic hydrocarbons but for the fact that hydroperoxide precursor of the hemiketal is expensive and difficult to obtain in quantity.

It is therefore an object of the present invention to provide a novel method for producing hemiketals.

It is another object to provide an improved method by which hemiketals may be obtained directly from cyclic hydrocarbons without the formation of a hydroperoxide intermediate.

It is a further object to provide a method for conveniently obtaining a variety of hemiketals which find use as intermediates in the formation of dibasic acids and other valuable chemical compounds.

These and still further objects of the present invention will become readily apparent to one skilled in the art from the following detailed description and specific examples.

Broadly, the present invention contemplates a method by which hemiketals having the general formula

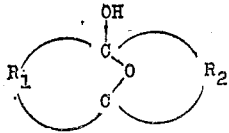

(I)

wherein $R_1$ and $R_2$ represent divalent organic radicals, are prepared by reacting an unsaturated cyclic organic compound having the formula

(II)

wherein $R_1$ and $R_2$ have the same meaning set forth above, with hydrogen peroxide in the presence of a strong inorganic acid.

More specifically, I have found that when an unsaturated cyclic organic compound having the Formula II above is admixed with a mixture comprising hydrogen peroxide and a strong inorganic acid such as $H_2SO_4$, HCl, and $H_3PO_4$ at a temperature of from about $-20$ to about $+45°$ C., the hemiketals of Formula I are obtained in good yield.

Preferably the hydrogen peroxide-inorganic acid mixture comprises from about 0.1 to about 1.0 mole $H_2O_2$ per equivalent of acid present. The $H_2O_2$-acid mixture may also contain from about 75 to about 25% by weight water. Conveniently, commercially available aqueous solutions of $H_2O_2$ containing from about 12 to about 100% $H_2O_2$ may be used in combination with concentrated inorganic acids which may contain from 0 to about 75% by weight $H_2O$.

While the ratio of $H_2O_2$-acid mixture to unsaturated cyclic organic compound present in the initial reaction mixture is not particularly critical, it is found that if from about 0.05 to about 0.5 mole of organic compound per mole of $H_2O_2$ present in the $H_2O_2$ mixture are used, satisfactory yields may be obtained. An excess of any reactant will not alter the course of the reaction, however, efficiency will be decreased.

It is generally preferred that the reactants be initially combined at temperatures below about $10°$ C. A convenient method for achieving a satisfactory starting mixture comprises slowly adding the organic compounds to a cooled $H_2O_2$-acid mixture. After the reactants have been combined, the mixture may be raised to a temperature as high as about $45°$ C. to complete the reaction. Under the temperatures specified above, it is found that satisfactory yields of hemiketal are obtained in from about 1 to about 12 hours.

Subsequent to the reaction the desired hemiketal may be separated from the reaction mixture by use of conventional extraction and/or crystallization procedures. Organic solvents such as ethyl ether, chloroform, pentane and petroleum ether are particularly useful for extracting the hemiketal from the acid residues present in the final reaction mixture. Further purification of the hemiketals affected by repeated crystallizations from organic solvents such as ethyl ether, ethyl alcohol, hexzene and petroleum ether.

As mentioned above the unsaturated cyclic organic compounds which may be reacted in the manner herein contemplated possess the structure wherein $R_1$ and $R_2$ represent divalent organic substituents. More specifically $R_1$ and $R_2$ may be defined as divalent radicals comprised of 2 to 9 methylene groups which may be substituted by practically any substituent which will not interfere with the reaction herein contemplated. Therefore, substituents which may be present on the methylene groups are halogen, alkyl, alkoxy, as well as divalent ring forming substituents such as alkenylene which, when attached to two methylene groups, form a condensed ring structure.

To more clearly illustrate the nature of $R_1$ and $R_2$, the following structural formulae of suitable divalent radicals are given:

(1) $-(CH_2)_m-$ wherein $m=2$ to 9.

(2) 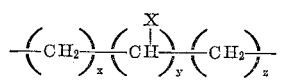

wherein $x+y+z=2$ to 9, and X may be halogen; alkyl having 1 to 9 and alkoxy having 1 to 9 carbon atoms.

(3) 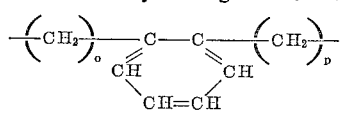

wherein $o+p=1$ to 6.

(4) 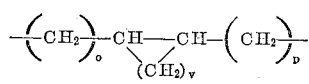

wherein $v=1$ to 6; and $o+p=1$ to 6.

Having described the basic aspects of the present invention, the following specific example is given to illustrate an embodiment thereof.

*Example*

80 grams of 30% aqueous hydrogen peroxide was placed in a 250 milliliter flask fitted with a thermometer, stirrer and addition funnel. The hydrogen peroxide was cooled to about 0° C. in an ice bath. A slurry comprising 80 grams of concentrated (98%) sulfuric acid and 31 grams of ice was slowly added to the chilled hydrogen peroxide. Next, 27.2 grams of 9,10-octalin was added dropwise to the hydrogen peroxide-sulfuric mixture. During the octalin addition the temperature of the reaction mixture was maintained below about 10° C. by means of an ice bath. When addition of the 9,10-octalin was complete, the reaction mixture was warmed to room temperature and stirred vigorously for 12 hours.

Upon completion of the reaction, the mixture was extracted with 250 milliliters of ethyl ether. This extract was dried over sodium sulfate and concentrated by evaporation to yield 27 grams of a pale solid. This represented 80% yield of cyclodecan-1-ol-6-one having the formula

which when recrystallized from petroleum ether yielded white crystals having a melting point of 63–65° C.

The above specific example clearly indicates that good yield of hemiketal may be obtained by reacting the corresponding unsaturated cyclic hydrocarbon with hydrogen peroxide in the presence of a strong inorganic acid. This method offers a new and direct process for obtaining hemiketals which were previously obtained by only inefficient and complicated synthesis methods.

I claim:
1. A process for preparing hemiketals of the formula

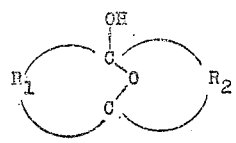

wherein $R_1$ and $R_2$ are alkylene radicals having 2 to 9 carbon atoms, which comprises reacting an unsaturated compound having the formula

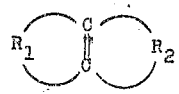

wherein $R_1$ and $R_2$ have the same meaning given above, with hydrogen peroxide in the presence of a strong mineral acid at a temperature of from about −20 to about +45° C., and recovering the hemiketal formed.

2. The process of claim 1 wherein from about 2 to about 20 moles of hydrogen peroxide are reacted with each mole of unsaturated compound.

3. The process of claim 2 wherein from about 2 to about 200 equivalents of mineral acid is present for each mole of unsaturated compound being reacted.

4. The process of claim 3 wherein the mineral acid is selected from the group comprising sulfuric, phosphoric, and hydrochloric acids.

5. The process of claim 4 wherein the unsaturated compound is 9,10-octalin and the hemiketal recovered is cyclodecan-1-ol-6-one.

6. A process for preparing hemiketals of the formula

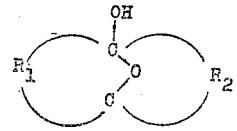

wherein $R_1$ and $R_2$ are alkylene radicals having 2 to 9 carbon atoms which comprises forming a mixture comprising hydrogen peroxide, from about 1 to about 10 equivalents of sulfuric acid per mole of said hydrogen peroxide, and from about 0 to about 50% by weight water, adding to said mixture from about 0.05 to about 0.5 mole of an unsaturated organic compound having the formula

wherein $R_1$ and $R_2$ are the same as given above, per mole of hydrogen peroxide present in said mixture, while maintaining said mixture at a temperature below about 10° C., heating said mixture to a temperature from about 20 to about 45° C. for a period of from about 1 to about 12 hours, and recovering the desired hemiketal from said reaction mixture.

7. The method of claim 6 wherein the unsaturated compound is 9,10 octalin and the hemiketal recovered is cyclodecan-1-ol-6-one.

No references cited.